June 21, 1966 W. KRAUS 3,256,755

ADJUSTABLE BORING HEAD

Filed April 30, 1963 3 Sheets-Sheet 1

INVENTOR.
WILHELM KRAUS

BY

*McGlew & Toren*
ATTORNEYS.

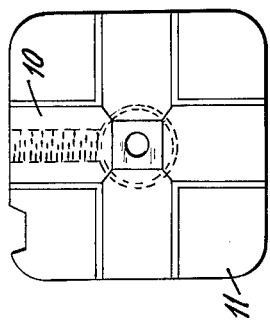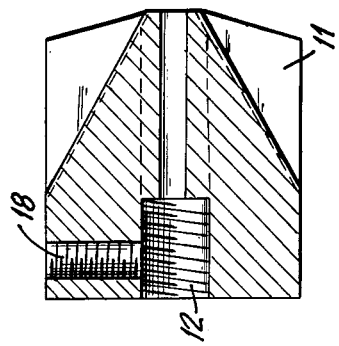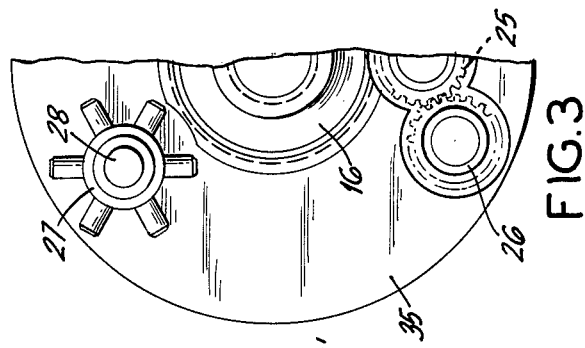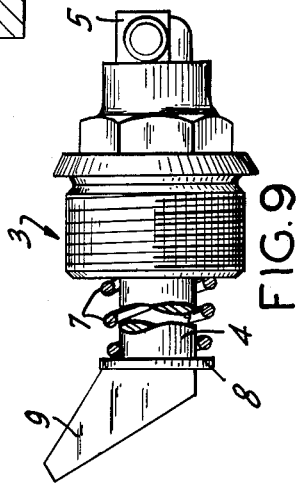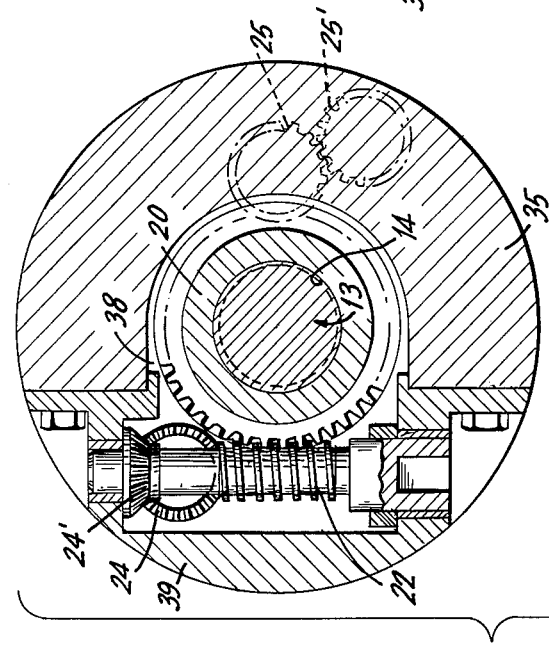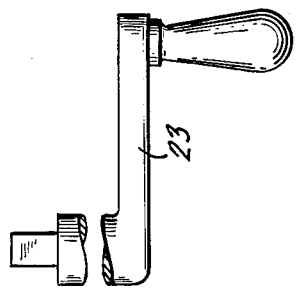

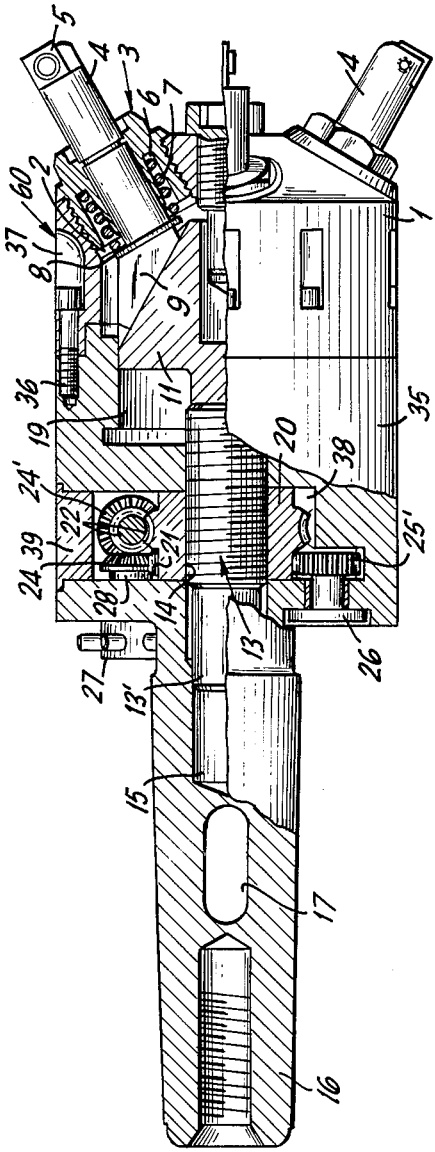
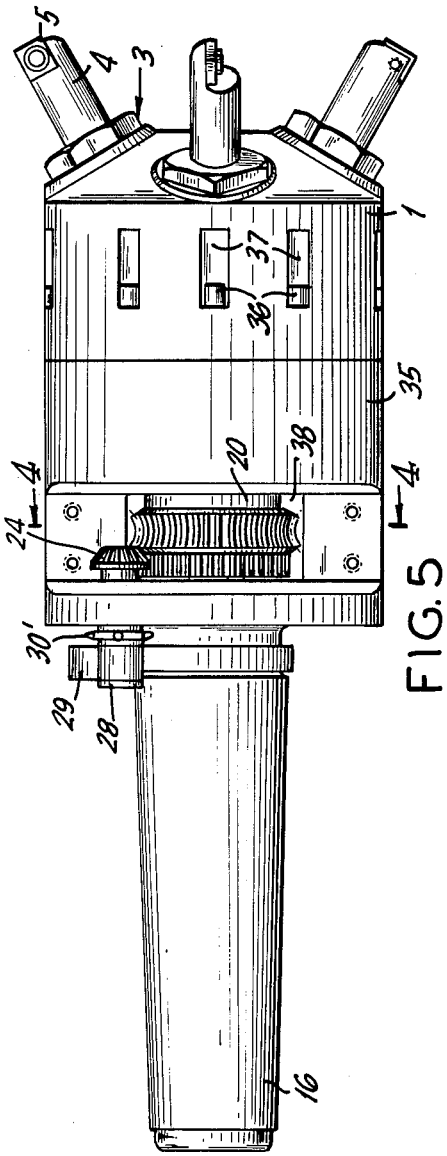

3,256,755
ADJUSTABLE BORING HEAD
Wilhelm Kraus, 4 Rue St.-Georges, Thann, France,
assignor of one-half to Edouard Meyer, Mulhouse-
Dornach, France
Filed Apr. 30, 1963, Ser. No. 276,812
5 Claims. (Cl. 77—58)

This invention relates in general to drilling or boring tools and in particular to a new and useful boring tool tail stock having a plurality of boring tool elements arranged at the boring end, which tool elements are uniformly displaceable inwardly and outwardly for cutting larger and smaller bores, respectively, in accordance with the movement of an axially displaceable spindle member.

The present invention has particular application in respect to the boring of large diameter holes, and particularly where it is necessary to form the bores into conical configurations, for example. In those instances in which a workpiece has to be drilled or bored with bores of a diameter which does not exceed about 50 to 75 mm., the drilling can be effected with ordinary drills, for example, with twist drills. The finished treatment or after treatment can be effected with ordinary drill rods. However, as soon as the diameters of the bores become larger, it is necessary to effect the boring or drilling with a boring tool of steel. These cutting steel tools are arranged perpendicular to or obliquely in relation to the rotational axis of the boring machine and are usually held in an adjustable tool holder or tail stock.

Prior to the present invention, boring heads were employed which include a single boring tool. Such devices have substantial disadvantages. On the one hand, the advancing or feeding of the tool may be at only a slow rate and the wear to which the tool is subjected is rapid relative to the diameter and depth to be cut. In addition, the precision of the boring is decreased, particularly when appreciable depths have to be bored. This is true because the cutting pressure acts on one side of the boring tool and the boring head so that deviations in exactness cannot be avoided. An essential disadvantage in the use of a single tool boring head is that the feed is so small that the output of the boring machine per time unit is exceedingly low and hence the labor costs for carrying out such work is excessive. Thus, for example, to bore a head of a large hydraulic press from cast steel with bores of 150 mm. in diameter and a depth of 500 to 700 mm. would take about 35 minutes for one single bore, even if a boring tool of hardened steel is employed. A further disadvantage is that while it may be possible to form the bored hole into a conical shape at the mouth of a bore or at the center of the bore, it has not been possible to shape such cones at the inner end of the bore.

In those instances where multi-tool bore heads are employed, some of the disadvantages mentioned above are avoided. However, the speeds of the heads in the structures known at present are accomplished exclusively by screw threads which are cumbersome and time consuming to operate on the one hand, and difficult to adjust in those instances where the boring head rotates.

In the present invention, there is provided a bore head having at least two bore tools or tool elements which are arranged in a manner so that opposing radial cutting pressures which are effected by rotation of the bore head will compensate each other. The tools are arranged for longitudinal displacement in guides which extend obliquely or are inclined in relation to the axis of the bore head. The bore head includes gearing, preferably worm gearing, which may be driven for the purpose of longitudinally displacing the cutting tool.

In accordance with one embodiment of the invention, a boring head is provided which includes a plurality of tool elements concentrically arranged in respect to the axis of the head and with the axes of the individual elements being inclined in respect to the axis of the head. The individual tool elements are biased inwardly, that is in the direction toward the axis of the head, and an axially movable spindle member is provided within the head for displacing the tool elements inwardly and outwardly. The spindle member includes a multi-faced end having slideways for accommodating an inner end of the tool element. The spindle is advanced or retracted in an axial dierction by means of gears provided in the tail stock housing, and such movement produces corresponding inward and outward movement of the tool element.

In accordance with one embodiment, the spindle is adjusted by means of a hand crank which is connected through worm gearing for displacing the spindle axially. In accordance with another embodiment of the invention, the displacement of the spindle may be carried out either by a sprocket wheel having sprocket elements which are indexed by a control member such as a cam for changing the position of the tool elements gradually as the drilling progresses, such as where it is desirable to form a conical bore.

In accordance with a further feature of the invention, the automatic displacement of the spindle member and the tool elements is carried out by means of a frictionally driven wheel element which may be positioned so that it is frictionally driven by a stationary member during the rotation of the bore head. In all of the embodiments it is advantageous to provide dial or gauge indications of the position of the spindle member which adjusts the position of the tool element.

Accordingly, it is an object of this invention to provide an improved drilling tool.

A further object of the invention is to provide a bore head which includes at least two boring tools arranged adjacent the boring end of the boring head in a manner such that their radial cutting pressures compensate each other, the boring tools being displaceable in guides which extend obliquely to the axis of the boring head, and including gear means for effecting such displacement.

A further object of the invention is to provide a drilling or boring tool which includes a head mounting a plurality of tool elements in a concentric manner with their axes extending obliquely to the axis of the head and including a longitudinally displaceable spindle member which includes a slide portion for each tool element which by axial displacement of the spindle member, is effective to displace each of the tool elements in directions along their respective axes.

A further object of the invention is to provide a bore head construction which includes a displaceable spindle member having an end portion with a plurality of faces each having a sliding groove, and with a tool element for each face arranged with their axes oblique to the axis of the head, and each with an end portion in sliding engagement in a respective groove of the spindle, and including gear means for displacing the spindle axially for advancing and retarding the tool elements.

A further object of the invention is to provide a boring head construction which includes a plurality of displaceable tool elements arranged in a substantially concentrical manner with means for shifting the tool elements in a direction toward and away from the axis of the head for changing the diameter of the hole which is being bored.

A further object of the invention is to provide a boring device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 2 is a partial side elevational and longitudinal section of the boring head indicated in FIG. 1;

FIG. 3 is a partial rear elevation of the boring head of FIG. 1;

FIG. 4 is a section taken on the line 4—4 of FIG. 5 of another embodiment of the invention;

FIG. 5 is a side elevation of another embodiment of the invention;

FIG. 7 is an end elevational view of the spindle rectangle;

FIG. 8 is a longitudinal section through the rectangle of FIG. 7; and

FIG. 9 is a side elevation, partly in section, of a tool guide.

Figure 1:
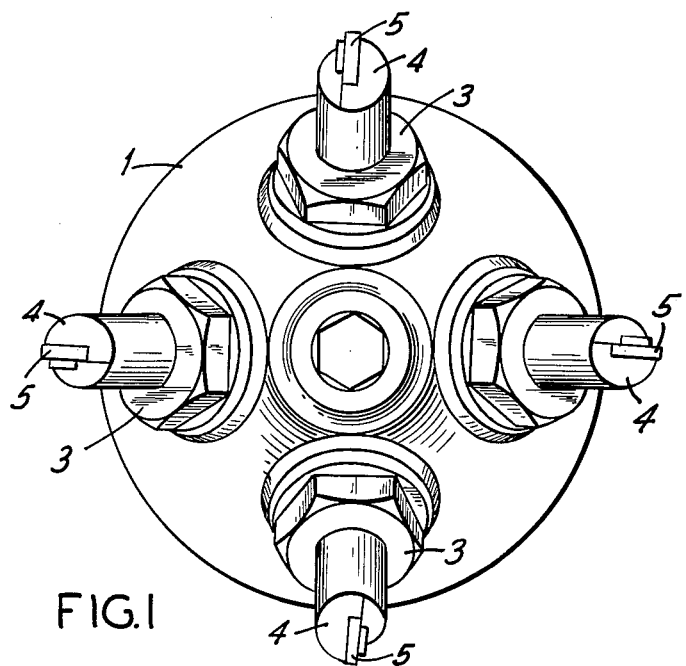
FIG. 1 is a front elevation of a bore head with four boring tools constructed in accordance with the invention.

Referring to the drawings in particular, the invention embodied therein as indicated in FIGS. 1 to 3 and 7 to 9 comprises a boring tool or boring head generally designated 60 which includes a front housing portion 1 having four bores or holes drilled obliquely at concentric locations around the axis of the head. Two guide members generally designated 3 are threaded into the bores 2 and are provided with a double-walled interior forming an annular cavity 6 which accommodates a compression spring 7, the outer end of which bears against a flange portion 8 of a tool or tool element 4. The guides 3 are arranged to extend at an angle which is less than 30° in respect to the axis of the bore head. The bore tools 4 are provided with hard metal plates or bits 5.

In accordance with the invention, each tool element 4 is provided with a gliding shoe or wedging cam 9 which slides in a trackway or groove 10 defined on a respective face of a four-faced member or rectangle 11. The compression spring 7 urges the shoe 9 into contact with the oblique grooves 10 of the rectangle 11 (see FIGS. 7 and 8).

As indicated in FIGS. 7 and 8, the rectangle 11 has at its inner base an opening or bore 12 which is threaded to receive a threaded end of an adjusting spindle or control member 13. The spindle 13 includes a large intermediate portion 14 which is threaded and threadably engaged on an interiorly threaded gear 20, as well as in a threaded portion of an upper housing member 35. The spindle includes a smooth end 13′ which is slidable in a smooth bore portion 15 of a tapered pin or Morse cone 16. The Morse cone 16 also has the customary ejection slit or slot 17. The spindle 13 is secured to the rectangle 11 by means of a set screw which extends through the threaded bore 18, as indicated in FIG. 8. The housing front portion 1 and the upper portion 35 have relatively large internal bores defining a space 19 providing a guideway for the rectangle 11 with the interior walls being squared to prevent rotation of the rectangle relative to the head. The rectangle 11 is adapted to the dimensions of the space 19.

The worm gear 20 which is threaded on the spindle 13 has a gear rim 21 (FIG. 2) which is in meshing engagement with a gear 25 affixed to a stub shaft member which carries a nonius or indicating wheel 26 which is exposed in a slot formed in the upper face of the upper housing portion 35.

A worm 22 meshes with a worm gear portion of the gear 20 to cause rotation thereof, adjustment of the spindle member 13, and effective adjustment of the tool element 4.

In the embodiment of FIG. 2, the worm gear 22 is driven by means of conical gears 24, 24′ from a rotatable socket member 27 which is arranged on the exterior end of a shaft 28 and which carries the bevel gear 24. The sprocket wheel 27 is rotated such as by a cam element (not shown), and preferably in accordance with the rotation of the boring head 60. The timing may be such as to cause rotation of the sprocket wheel 27 after several rotations of the boring head or any portion thereof.

Figure 6:
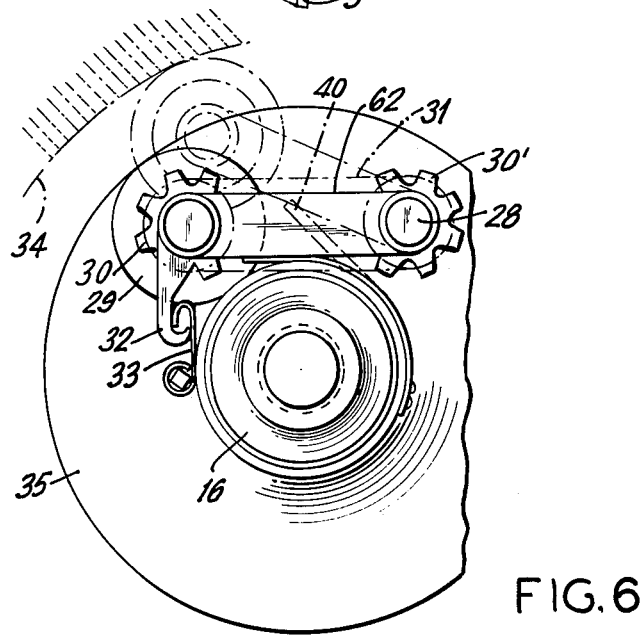
FIG. 6 is a view similar to FIG. 3 of the embodiment indicated in FIG. 5.

In the alternate embodiment of FIGS. 5 and 6 where similar parts are similarly designated, there is provided a friction wheel 29 which is rotatably supported on one end of a block member 62, the opposite end of which is freely rotatable around the shaft 28. The block member 62 carries a latching hook 32 at its outer end which may be engaged with a resilient member or spring 33 carried on the Morse cone 16 when the device is in a non-operative position. When it is desired to have the device function to advance the control member or spindle 13, the block member 62 is swung outwardly to the dotted line position indicated in FIG. 6 to cause the friction wheel 29 to bear against a curved friction surface 34 of a stationary member to effect rotation of the friction wheel and also rotation of the shaft 28 which is driven through sprockets 30 and 30′ and sprocket chain 31.

The front portion 1 is connected with the rear portion 35 by means of screws 36. The screws 36 are inserted in cutouts 37 of the front portion 1. In the rear portion 35 there is provided a corresponding cutout or recess 38 which accommodates the feed drive with the worm gear 20 and worm 22. The worm 22 is advantageously mounted in the lid 39 which closes the cutout 38 (FIG. 4).

The operation of the device is as follows: If a cylindrical bore is to be produced, then the boring tools 4 with their hard metal bits 5 are first adjusted to the starting diameter. This is effected by rotating the crank 23 and adjusting the control member or spindle 13 by drive through the worm 22 and the worm gear 20. When the feed spindle 13 and the rectangle 11 are axially displaced, the inclined engaging surfaces of the trackway 10 and the glide shoes 9 cause displacement of the tool elements in relation to their individual axes. When the rectangle is advanced forwardly, that is to the right as indicated in FIG. 1, the tools are advanced outwardly against the pressure of the compression spring 7. Upon reverse of the movement of the spindle member 13, the springs 7 urge the shoes 9 into following engagement with the retreating rectangle. The extent of the movement can be ready by the nonius 26 which is rotated due to engagement of the gear 25 with the gear portion 21. It is, of course, feasible to have the spindle affixed to the worm gear 20 and threaded in a stationary member so that when the worm gear with the spindle is rotated, there will be an axial displacement of the spindle member.

After the bore head has been thus adjusted, the tool can then enter the workpiece. The speed of the device relative to bore heads having a single tool will be a function of the number of tools mounted in the bore head. Thus, for example, if four tools are mounted as in the embodiment illustrated, the speed will be four times greater than where a single tool is provided. It is also possible, particularly when large diameters have to be bored, to provide six or eight tools. It is advantageous, however, always to choose an even number. In this manner, bore speeds which are six to eight times as great as those of conventional tools may be obtained. It will be obvious to those skilled in the art that in the case of a number of tools other than four, instead of using a rectangle, a shaped member such as a hexagon, octagon, etc. with a corresponding number of gliding tracks 10 will have to be employed in accordance with the number of tools which are employed.

As soon as the desired bore depth has been reached and the bore heads have been retracted from the workpiece, the feed spindle 13 with the rectangle 11 is rotated forwardly by the crank 23 to cause the complete exiting of the tools 4 from the guide 3. The magnitude of this forward movement is dependent on the nature of the material, the quality of the boring tools and their hard metal bits, and their rotational speed in order to adjust the next run. The extent of the adjustment can be read by the nonius 26. This procedure is repeated until the desired bore diameter has been reached.

Due to the large number of tools, the boring operation is, of course, shortened. Therefore, the adjustments for larger diameters can be effected much more rapidly than in a single-tool boring head. Because the boring tools are arranged so that the boring pressures are compensated and because no one-sided pressure is exerted on the boring spindle, the boring can be effected to great depth and with great precision. In addition to the fact that the boring operation can be carried out in much shorter time, and hence with a large saving of labor time, better results can also be obtained.

Due to the fact that the tools of the present head construction are not arranged perpendicular to the rotational axis but extend beyond the free end of the boring head, a cone may be formed with the inventive arrangement not only at the exit or mouth of the hole or bore, or in the center, but at the bottom end of the hole. Irrespective of where the cone is formed, the following procedure wil be adopted to produce the cone:

The tools are adjusted as to the largest cone diameter in the same manner as has been described above in respect to the formation of a cylindrical bore. However, since it would be much too cumbersome and time consuming manually to cause retraction of the tools during the boring in order to form the cone, this adjustment is caused automatically by a driving arrangement effective for conical boring. As mentioned previously, in accordance with one embodiment and as indicated in FIGS. 4, 5 and 6, the adjustment is made by frictional engagement of the friction wheel 29 with a stationary wheel 34, the timing being adjustable in accordance with the size of the wheel 29 and the size of the sprockets effecting the transmission of motion.

In the embodiment indicated in FIG. 1, a cam (not shown) is provided to index or rotate the switching wheel 27 after a predetermined number of revolutions of the boring head. The taper of the cone which is to be produced can be adjusted and may depend on the number of rotations after which sprocket wheel 27 is indexed or rotated to cause an advance of the control member or spindle 13. Of course, when the embodiment of FIG. 6 is employed, the hook member 32 must be disengaged from the spring 33 and a spring 40 urges the block 62 outwardly to bring the friction wheel 29 into engagement with the stationary friction surface 34. The diameter of the friction surface 34 may be variable which, of course, will determine the timing of the advance of the control spindle 13. The larger the diameter of the friction surface 34, the faster the rotation of the friction wheel during rotation of the boring head and thus the more rapid advance of the tools will be effected. Since only the pressure of the spring 7 has to be overcome in order to advance the tools, the friction drive between the wheel 29 and the stationary surface 34 will be sufficient and no slippage would be likely to occur.

The advantages of the inventive boring head may be summarized as follows:

Due to the fact that the adjustments of the tools are accomplished by a gearing, only a fraction of the time is required for such adjustment as would be the case where the adjustment is effected by threads. The fact that the after-adjustment of the head is performed while the head rotates in an automatic manner saves time and labor and increases the exactness of the boring work. This, of course, produces economic advantages in respect to shop time and labor time. In addition, the inventive arrangement makes it possible to work the base or bore in a conical manner which has not been possible with prior art tools. The particular angular orientation of the tool may advantageously be 30° or any angle which may be determined by the cones which have to be drilled, the nature of the tool, the diameters which are desired, etc. In addition, the gearing used for the adjustment may be other than the worm type gearing which is indicated in the various figures; for example, an ordinary gear wheel gearing with helical gears may be employed rather than worm gears, or planetary gearing may be used.

While specific embodiments of the invention have been shown and described in detail to illustrate the application of the principles of the invention, it will be understood that this invention may be embodied otherwise without departing from such principles.

What is claimed is:

1. An adjustable boring head comprising a housing, a plurality of boring tools mounted in said housing with their axes extending at an angle with respect to the axis of said head, said tools being axially shiftable in the mountings of said housing, and means for shifting said boring tools axially, including rotatable gears, said means for displacing said tools including a rotatable friction wheel, and a member having a surface adjacent said head engageable with said friction wheel for advancing said tools during rotation of said head.

2. An adjustable boring head comprising a boring head housing, a spindle concentrically arranged in said housing and axially adjustable therein, said spindle having an end with a plurality of oblique face portions concentrically arranged, a plurality of tool elements of a number corresponding to the oblique face portions on the end of said spindle, said tool having shoe portions with oblique faces slidable on the oblique faces on the end of said spindle, a gear threaded on the exterior of said spindle, a worm rotatable in said boring head housing and engaged with said gear to rotate said gear upon rotation of said worm, and control means connected to said worm to rotate said worm for advancing and retracting said tool, said control means including a crank member.

3. An adjustable boring head comprising a boring head housing, a spindle concentrically arranged in said housing and axially adjustable therein, said spindle having an end with a plurality of oblique face portions concentrically arranged, a plurality of tool elements of a number corresponding to the oblique face portion on the end of said spindle, said tool having shoe portions with oblique faces slidable on the oblique faces on the end of said spindle, a gear threaded on the exterior of said spindle, a worm rotatable in said boring head housing and engaged with said gear to rotate said gear upon rotation of said worm, and control means connected to said worm to rotate said worm for advancing and retracting said tools, said control means including a rotatable sprocket wheel mounted on the exterior of said boring head housing in a position for engagement by a member during rotation of said boring head.

4. An adjustable boring head comprising a boring head housing, a spindle concentrically arranged in said housing and axially adjustable therein, said spindle having an end with a plurality of oblique face portions concentrically arranged, a plurality of tool elements of a number corresponding to the oblique face portion on the end of said spindle, said tool having shoe portions with oblique faces sildable on the oblique faces on the end of said spindle, a gear threaded on the exterior of said spindle, a worm rotatable in said boring head housing and engaged with said gear to rotate said gear upon rotation of said worm, and control means connected to said worm to rotate said worm for advancing and retracting said tools, said control means including a rotatable shaft driving said spindle member, a pivotal block member freely carried on said rotatable shaft and pivotal outwardly from said head, and a friction wheel drivingly connected to said shaft and rotatable on said blocks adapted to be positioned in frictional engagement with a stationary curved member for controlling the inward and outward movement of said tools during rotation of said boring head.

5. An adjustable boring head comprising a boring head housing, a spindle concentrically arranged in said housing and axially adjustable therein, said spindle having an end with a plurality of oblique face portions concentrically arranged, a plurality of tool elements of a number corresponding to the oblique face portion on the end of said spindle, said tool having shoe portions with oblique faces slidable on the oblique faces on the end of said spindle, a gear threaded on the exterior of said spindle, a worm rotatable in said boring head housing and engaged with said gear to rotate said gear upon rotation of said worm, and control means connected to said worm to rotate said worm for advancing and retracting said tools, said control means including a rotatable shaft driving said spindle member, a pivotal block member freely carried on said rotatable shaft and pivotal outwardly from said head, and a friction wheel drivingly connected to said shaft and rotatable on said blocks adapted to be positioned in frictional engagement with a stationary curved member for controlling the inward and outward movement of said tools during rotation of said boring head, and means for latching said block in an inoperative position.

References Cited by the Examiner

UNITED STATES PATENTS

| | | |
|---|---|---|
| 1,362,529 | 12/1920 | Ehlers. |
| 2,409,578 | 10/1946 | McDonald. |
| 2,672,771 | 3/1954 | Rogers. |
| 2,956,456 | 10/1960 | Bisceglia et al. |

FOREIGN PATENTS

| | | |
|---|---|---|
| 667,903 | 7/1963 | Canada. |
| 743,904 | 4/1933 | France. |
| 759,981 | 2/1934 | France. |
| 853,087 | 10/1952 | Germany. |
| 391,980 | 5/1933 | Great Britain. |
| 923,620 | 4/1963 | Great Britain. |
| 138,455 | 5/1961 | Russia. |

WILLIAM W. DYER, JR., *Primary Examiner.*

DONALD R. SCHRAN, *Examiner.*

G. A. DOST, *Assistant Examiner.*